United States Patent [19]
Lu et al.

[11] Patent Number: 6,048,611
[45] Date of Patent: *Apr. 11, 2000

[54] HIGH SOLIDS MOISTURE RESISTANT LATEX PRESSURE-SENSITIVE ADHESIVE

[75] Inventors: Ying-Yuh Lu; Michael D. Crandall; Robert D. Koppes, all of Woodbury, Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 07/829,899

[22] Filed: Feb. 3, 1992

[51] Int. Cl.$^7$ .............................. C08J 9/04; C08K 9/04; C09J 7/02; G02B 5/128

[52] U.S. Cl. ............................ 428/355 AC; 359/538; 359/540; 428/41.8; 524/533; 524/832; 524/833; 525/302; 525/303; 525/304; 525/305; 525/309; 525/310

[58] Field of Search ............................ 524/533, 832, 524/833; 525/302, 309, 310, 303, 304, 305, 244; 428/355, 41.8, 355 AC; 359/538, 540

[56] References Cited

U.S. PATENT DOCUMENTS

| | | | |
|---|---|---|---|
| Re. 24,907 | 12/1960 | Ulrich | 206/59 |
| 3,637,563 | 1/1972 | Christena | 260/29.6 |
| 3,700,305 | 10/1972 | Bingham | 350/105 |
| 3,758,192 | 9/1973 | Bingham | 350/105 |
| 3,919,154 | 11/1975 | Chang et al. | 524/832 |
| 3,922,464 | 11/1975 | Silver et al. | 428/355 |
| 3,925,442 | 12/1975 | Samour | 260/459 |
| 3,953,386 | 4/1976 | Murphy et al. | 260/17 |
| 3,983,166 | 9/1976 | Samour | 260/481 |
| 4,011,388 | 3/1977 | Murphy et al. | 526/320 |
| 4,025,159 | 5/1977 | McGrath | 350/105 |
| 4,103,060 | 7/1978 | Bingham et al. | . |
| 4,130,523 | 12/1978 | Hoy et al. | 260/29.6 |
| 4,186,120 | 1/1980 | Ugelstad | 260/29.6 |
| 4,590,238 | 5/1986 | Furomoto et al. | 524/745 |
| 4,629,663 | 12/1986 | Brown et al. | 428/343 |
| 4,645,711 | 2/1987 | Winslow et al. | 428/355 |
| 4,645,783 | 2/1987 | Kinoshita | 523/221 |
| 4,670,504 | 6/1987 | Cardenas et al. | 524/533 |
| 4,693,776 | 9/1987 | Krampe et al. | . |
| 4,737,559 | 4/1988 | Kellen et al. | . |
| 4,780,503 | 10/1988 | Mallya | 524/460 |
| 4,847,137 | 7/1989 | Kellen et al. | . |
| 5,013,784 | 5/1991 | Yang | 524/458 |
| 5,206,286 | 4/1993 | Swarup et al. | 524/761 |
| 5,496,603 | 3/1996 | Riedel et al. | . |
| 5,631,073 | 5/1997 | Riedel et al. | . |
| 5,679,190 | 10/1997 | Riedel et al. | . |

FOREIGN PATENT DOCUMENTS

| | | | |
|---|---|---|---|
| 0 118 726 | 9/1984 | European Pat. Off. | C09J 3/14 |
| 0 194881 | 9/1984 | European Pat. Off. | C08F 200/18 |
| 118726 | 9/1984 | European Pat. Off. | . |
| 0 311 715 | 4/1989 | European Pat. Off. | C08F 220/18 |
| 0 342 808 | 11/1989 | European Pat. Off. | C09J 3/14 |
| 24 07 494 | 8/1975 | Germany | . |
| 51-2793 | 1/1976 | Japan | . |
| 57-108112 | 7/1982 | Japan | . |
| 63-23727 | 2/1988 | Japan | . |
| 63-72331 | 4/1988 | Japan | . |
| 63-72332 | 4/1988 | Japan | . |
| 63-72333 | 4/1988 | Japan | . |
| 63-214330 | 9/1988 | Japan | . |
| 63-214331 | 9/1988 | Japan | . |
| 63-214332 | 9/1988 | Japan | . |
| 63-214333 | 9/1988 | Japan | . |
| 2-80482 | 3/1990 | Japan | C09J 151/06 |
| 3-2293 | 1/1991 | Japan | . |
| 63-183998 | 7/1998 | Japan | . |
| 1 191 649 | 5/1970 | United Kingdom | C08F 3/56 |
| WO 89/12618 | 12/1989 | WIPO | C07C 41/16 |
| WO 90/15853 | 12/1990 | WIPO | C09J 151/00 |

OTHER PUBLICATIONS

Test Methods for Pressure–Sensitive Tapes, 8th Ed., Aug. 1985, Pressure–Sensitive Tape Council, Glenview, IL.

Emulsijn Polymerization: Theory and Practice, D. C. Blackley, New York, J. Wiley & Sons, Dec. 1975.

*Primary Examiner*—Blaine Copenheaver

[57] ABSTRACT

The present invention relates to a water-based high-solids moisture-resistant latex pressure sensitive adhesive which has a low coating viscosity and which has high shear, high compliance, and controlled adhesion buildup.

37 Claims, No Drawings

HIGH SOLIDS MOISTURE RESISTANT LATEX PRESSURE-SENSITIVE ADHESIVE

FIELD OF THE INVENTION

The present invention relates to a water-based high-solids moisture-resistant latex pressure sensitive adhesive which has a low coating viscosity and which has high shear, high compliance, and controlled adhesion buildup.

BACKGROUND OF THE INVENTION

The advantage of acrylic polymers as viscoelastic bases for pressure-sensitive adhesives are well known in the art. U.S. Pat. No. RE 24,906 (Ulrich) cites many examples of these products. Initially, such compositions were made via solution polymerization. However, such methods of polymerization involved the use of large amounts of organic solvents. This was undesirable for both safety and economic reasons. Further, the necessity of an excess of such solvents in order to render the polymers transferable between containers drastically limited the handleability and transportability of the polymers.

Various methods of suspension or emulsion polymerization for copolymer pressure-sensitive adhesives have been disclosed in the art. Emulsion polymerization uses water as the reaction medium, and the polymerization takes place within a micelle which easily dissipates the exotherm due to heat of polymerization. Because water is the solvent, the resulting emulsion is safer to handle.

While emulsion polymerization has these distinct advantages, the energy required to dry the water from coated latex materials is about five times higher than for most solvents. Also, the water portion of a dilute latex constitutes a large amount of excess storage capacity and shipping weight when handling emulsion polymers. Thus, there is considerable interest in producing so-called "high-solids" latexes to alleviate some of these problems. Unfortunately, in many cases achieving high solids also meant achieving high viscosities, so that coating the latexes was difficult and expensive.

Thus, there is ongoing interest in producing a high-solids latex adhesive with low viscosity in order to reduce shipping, handling and storage costs, allow increased productivity in plant equipment, reduce drying time for applied latexes, allow the application of films of any desired thickness in fewer passes, and save energy in the drying of latex coatings.

An additional problem with latex adhesives is their sensitivity to moisture, due to the presence of surfactant required in their production. These adhesives become cloudy and lose adhesion and shear strength on exposure to moisture. Moisture-insensitive latex adhesives are thus a desirable goal, and would find use in such applications as weather-sealing tapes, medical tapes, label stock, etc.

WO 89-12618 (Dec. 28, 1989), assigned to PPG Industries, Inc. describes the preparation of ionic alpha-beta ethylenically unsaturated poly(alkylenoxy) surfactants, available under the tradename Mazon SAM 211. Copolymers made with these surfactants, acrylic and methacrylic ester monomers, and from monoethylenically unsaturated monocarboxylic acids, are described. The polymers are said to have good water resistance. No added hydrophobic oligomeric species are described.

EP 194,881 (Mar. 13, 1986), to Smith & Nephew, describes emulsion polymer adhesives which are particularly adapted for application to skin, wherein a copolymerizable surfactant is included in the reaction mixture. The resultant PSAs are said to have good moisture resistance and to produce surgical tapes which adhere well to human skin under dry and wet conditions and onto sweaty skin. Again, no hydrophobic oligomers are present in the reaction mixtures.

U.S. Pat. Nos. 3,925,442 and 3,983,166, assigned to Kendall Company, both incorporated by reference herein teach copolymerizable surfactants. The use of these surfactants in the emulsion polymerization of acrylate monomers is described. These references do not refer to producing acrylate adhesives nor to added styrene (or any other) oligomer, either before or after polymerization.

JP 03 002293 (Jan. 8, 1991), to Soken Kagaku KK, describes emulsion polymerization of acrylic acid esters of $C_4$–$C_{12}$ alcohols in the presence of a copolymerizable surfactant, with an added monomer of at least one of (meth)acrylic acid or acrylamide. The resultant adhesive is described as having low viscosity and good wetting properties to release paper etc. No added oligomer is mentioned.

U.S. Pat. No. 5,013,784, assigned to Exxon, discloses emulsion copolymerization of acrylic acids and esters in the presence of a low-molecular weight, partially aromatic hydrocarbon resin to form a pressure-sensitive adhesive with good properties. No copolymerizable surfactants are used or taught.

Japanese Patent 90/80,482, assigned to Kanebo NSC K.K., describes emulsion copolymerization of methyl acrylate, 2-ethylhexyl acrylate and acrylic acid in the presence of a rosin ester tackifier to form an adhesive. Copolymerizable surfactants are not taught.

Japanese Patent JP 76/002,793, assigned to Petroleo Brasileiro S. A.-Petrobras, discusses the use of styrene oligomer as a dispersing agent in the aqueous suspension copolymerization of styrene and acrylonitrile. No end use of the copolymer is discussed.

U.S. Pat. Nos. 4,645,711 and 4,629,663, both assigned to 3M, disclose emulsion copolymerization of acrylate monomers in the presence of a vinyl-unsaturated homopolymerizable emulsifier monomer which is a surfactant having both a hydrophobic and a hydrophilic moiety, at a concentration of 5%–50%, preferably 10%–40%. The mixture is coated, dried and used as a pressure-sensitive adhesive. The preferred emulsifier monomer is a monovalent salt of a styrene sulfonate, such as sodium styrene sulfonate. In U.S. Pat. No. 4,645,711, tackifiers, one of which is an alpha-methylstyrene oligomer, are added to the aqueous dispersion after polymerization.

Likewise, U.S. Pat. No. 3,922,464, Silver, et al., assigned to 3M, discloses the use of vinyl-unsaturated homopolymerizable emulsifier monomers which are surfactants having both a hydrophobic and a hydrophilic moiety in emulsion polymerizations of acrylate monomers. In addition, Silver et al. employ a zwitterionic copolymerizable monomer for improved adhesive properties. The emulsifier monomer is used at a concentration of 0.2 to 5 parts by weight while the zwitterionic monomer is used at 0 to 10 parts by weight. No tackifier or other added oligomer is disclosed or claimed.

A need thus exists for a water-based high-solids moisture-insensitive latex pressure-sensitive adhesive which has a low coating viscosity and which has high shear, high compliance and controlled adhesion build-up. We have found such an adhesive.

SUMMARY OF THE INVENTION

The latex PSA of the invention is distinguished from known latex PSAs by the presence, in unusually low amounts, relative to the 30 to 40% tackifiers used in conventional PSAs, of a low-molecular weight hydrophobic polymer in the reaction mixture (most preferably about 2 to about 5%), which enhances the emulsion stability during polymerization by inhibiting monomer diffusion from smaller droplets to larger droplets and absorbing more surfactant to the surface of the monomer droplets and improving compliance of the resultant PSA; and polymerization in the presence of an ionic copolymerizable surfactant which improves cohesive strength and imparts moisture resistance. The combination of these two components is not known in the prior art. The latex PSA of the invention also demonstrates good adhesion to low-energy surfaces while maintaining good shear characteristics.

We have discovered a high-solids latex adhesive which is moisture-insensitive and which, in addition, displays an excellent balance of adhesive properties such as high compliance and high shear with controlled adhesive build. The presence of a copolymerizable surfactant and a low molecular weight hydrophobic polymer in the latex formulation are two unique aspects of the adhesive which contribute to its desirable properties.

The present invention relates to a latex pressure-sensitive adhesive which is produced via emulsion polymerization, wherein an ionic copolymerizable surfactant and a hydrophobic low molecular weight non-copolymerizable polymer are included in the reaction mixture along with acrylate monomers, typically a low $T_g$ acrylate ester such as IOA, a high $T_g$ vinyl ester monomer such as vinyl acetate, and a polar acrylic monomer such as acrylic acid. The unique combination of ionic copolymerizable surfactant and added hydrophobic polymer in the emulsion polymerization reaction mixture has not been described previously, and provides a water-based adhesive having a unique set of desirable properties: high initial adhesion with controlled adhesion build-up, along with low lift and absence of residue; good adhesion to low energy surfaces coupled with high shear; high solids coupled with low viscosity; and good moisture resistance.

The present invention provides a latex comprising:
(a) about 40 to about 70 weight percent of a solid phase, the solid phase comprising the reaction product of:
  (i) about 70 to about 98.5 percent by weight of monomer selected from the group consisting of $C_4$ to $C_{12}$ alkyl acrylate ester monomers and mixtures thereof;
  (ii) about 0 to about 20 percent by weight of monomer selected from the group consisting of vinyl esters, $C_1$ to $C_4$ esters of (meth)acrylic acid, styrene, and mixtures thereof;
  (iii) about 1 to about 10 percent by weight of polar monomer copolymerizable with said monomer(s) of element (a)(i) and element (a)(ii);
  (iv) about 0.5 to about 20 percent by weight of a hydrophobic polymer which is incapable of reaction with said monomers of elements (a)(i), (a)(ii), and (a)(iii), wherein said hydrophobic polymer has a number average molecular weight ranging from about 400 to about 50,000;
  (v) about 0.01 to about 1 percent by weight of an initiator;
  (vi) about 1 to about 10 percent by weight of an ionic copolymerizable surfactant;
  (vii) about 0 to 1 percent by weight of a chain transfer agent; and
  (viii) about 0 to 5 percent by weight of a crosslinking agent;
  wherein the weight percentages of (v), (vi), (vii), and (viii) are each based on the total weight of (i) plus (ii) plus (iii) plus (iv) and wherein the weight percentages of (i), (ii), (iii) and (iv) are each based on the total weight of (i) plus (ii) plus (iii) plus (iv);
(b) about 30 to about 60 percent by weight of an aqueous phase;
  wherein the weight percentages of (a) and (b) are each based on the total weight of the latex.

DETAILED DESCRIPTION OF THE INVENTION

Preferably the latex of the invention comprises about 50 to about 65 percent by weight solid phase and about 35 to about 50 percent by weight aqueous phase, most preferably about 55 to about 62 percent by weight solid phase and about 38 to about 45 percent by weight aqueous phase, based upon the total weight of the latex, in order to minimize the aqueous phase and thus conserve energy during the drying of the latex, in order to minimize storage and shipping costs, and in order to maximize plant productivity.

$C_4$–$C_{12}$ Alkyl Acrylate Ester Monomer

Examples of useful $C_4$ to $C_{12}$ alkyl acrylate ester monomers include but are not limited to those selected from the group consisting of n-butyl acrylate, amyl acrylate, hexyl acrylate, isooctyl acrylate, 2-ethylhexyl acrylate, isononyl acrylate, decyl acrylate, dodecyl acrylate, and mixtures thereof. Preferred monomers include those selected from the group consisting of isooctyl acrylate, n-butyl acrylate, and mixtures thereof, for reasons of availability and influence on final properties.

High $T_g$ Monomer

A second monomer component comprises monomer selected from the group consisting of 1) vinyl esters including but not limited to vinyl acetate, vinyl propionate, vinyl butyrate, and the like, 2) $C_1$ to $C_4$ alkyl esters of (meth) acrylic acid, including but not limited to methyl methacrylate, methyl acrylate, ethyl acrylate, ethyl methacrylate, isobutyl methacrylate, and the like, 3) styrene, and mixtures thereof. The preferred high $T_g$ monomer is vinyl acetate for reasons of availability.

Polar Copolymerizable Monomer

Examples of useful polar copolymerizable monomers include but are not limited to those selected from the group consisting of acrylic acid, methacrylic acid, itaconic acid, hydroxyalkyl acrylates, styrene sulfonic acid and its sodium salt, maleic acid, fumaric acid, citraconic acid, acrylamides, substituted acrylamides, N-vinyl lactams such as N-vinylpyrrolidone, N-vinylcaprolactam, acrylonitrile, dimethylamino ethylmethacrylate, and mixtures thereof. Preferred polar copolymerizable monomers include those selected from the group consisting of acrylic acid, methacrylic acid, acrylamides, substituted acrylamides, and mixtures thereof, for reasons of availability and influence on polymer properties.

Low Molecular Weight Noncopolymerizable Hydrophobic Polymer

The term "hydrophobic polymer" as used herein refers to a water insoluble polymer. Useful hydrophobic polymers have a number average molecular weight ranging from about 400 to about 50,000; preferably about 500 to about 20,000; most preferably about 600 to about 10,000. If the hydrophobic polymer had a molecular weight greater than about 50,000, polymer phase separation would result. If the hydrophobic polymer had a molecular weight of less than about 400, the hydrophobic polymer would act as a plasticizer.

Examples of useful low molecular weight noncopolymerizable hydrophobic polymers include but are not limited to those selected from the group consisting of polystyrene resins such as Piccolastic™ A-75, D-125, and D-150 available from Hercules Chemicals; poly(methylmethacrylate) (PMMA) resin; polybutadiene; poly(alpha-methylstyrene); butadiene-styrene block copolymers; rosin esters such as Foral™ 85 and 105, available from Hercules, and mixtures thereof. Preferred hydrophobic polymers are the polystyrene resins Piccolastic™ A-75 and D-125, for reasons of availability.

Copolymerizable Ionic Surfactant

Examples of useful copolymerizable ionic surfactants include but are not limited to those described in WO 89/12618, incorporated by reference herein. The surfactants described therein have a hydrophobic portion containing alpha-beta ethylenic unsaturation, a hydrophilic portion containing a poly(alkyleneoxy) segment, and an ionic segment.

According to WO 89/12618, the reactive surfactants arise from successive condensation polymerizations of an ethylenically-unsaturated alcohol with a prescribed amount of a first cyclic ether, e.g., propylene oxide, butylene oxide or a mixture thereof, followed by condensation with a prescribed amount of ethylene oxide. Cationic or anionic end-group functionality is added via the terminal hydroxyl group, as desired.

The ionic copolymerizable surfactant has at least one group, preferably one group, capable of reacting with $C_4$–$C_{12}$ alkyl acrylate ester monomer, high Tg monomer, and/or polar copolymerizable monomer. Such reactive groups include but are not limited to those groups selected from the group consisting of ethylenically unsaturated groups such as vinyl groups, acrylate groups, etc.

The preferred copolymerizable surfactant, which has the trade name MAZON SAM-211, is available from PPG Industries, Inc. and is described as an alkylene polyalkoxy ammonium sulfate, wherein the number of alkoxy groups is between about 5 and about 25, with a typical example having about 15 to about 20 ethoxy groups. Examples of additional useful copolymerizable surfactants include alkyl allyl sulfosuccinates such as TREM-LF40, available from Diamond Shamrock Company. Additional useful copolymerizable surfactants are disclosed in U.S. Pat. Nos. 3,925,442 and 3,983,166, assigned to The Kendall Company, both incorporated by reference herein.

It is also envisioned that the latex of the present invention can be made using a mixture of a copolymerizable surfactant as delineated above and a typical ionic or nonionic noncopolymerizable surfactant commonly known in the art of latex polymerization, in place of the ionic copolymerizable surfactant above. Example of such noncopolymerizable surfactants can be found in "Emulsion Polymerization: theory and practice", by D. C. Blackley, New York, J. Wiley (1975), incorporated by reference herein. In using a mixture of surfactants, at least about 40% of the mixture of surfactants must be a copolymerizable surfactant in order to retain the desirable properties of the latex of the present invention. The surfactant mixture comprises about 40 to about 99.5 percent by weight of an ionic copolymerizable surfactant and about 0.5 to about 60 percent by weight of a noncopolymerizable surfactant, based upon the total weight of the surfactant mixture.

Examples of such noncopolymerizable surfactants include but are not limited to those selected from the group consisting of anionic surfactants such as higher alcohol sulfates, alkylbenzenesulfonates, polyoxyethylene alkyl ether sulfates, polyoxyethylene alkylphenol ether sulfates, or dialkyl sulfosuccinates, and nonionic surfactants such as polyoxyethylene alkyl ethers, polyoxyethylene alkyl phenol ethers, or polyoxyethylene/polyoxypropylene block copolymer.

Crosslinking Agent

The latex of the present invention may optionally further comprise a crosslinking agent. Examples of useful crosslinking agents include but are not limited to those selected from the group consisting of multifunctional acrylates such as diacrylates, triacrylates, and tetraacrylates, such as 1,6-hexanedioldiacrylate, poly(ethylene glycol)diacrylates, poly(butadiene)diacrylates, polyurethane diacrylates, and trimethylolpropane triacrylate; 4-acryloxybenzophenone; divinyl benzene; and mixtures thereof. Preferred crosslinkers are those selected from the group consisting of 1,6-hexanedioldiacrylate (HDDA), poly(ethylene glycol) diacrylates, 4-acryloxybenzophenone, and mixtures thereof for reasons of availability.

Chain Transfer Agent

The latex of the present invention may optionally further comprise a chain transfer agent. Examples of useful chain transfer agents include but are not limited to those selected from the group consisting of carbon tetrabromide, mercaptans, alcohols, and mixtures thereof. Preferred chain transfer agents include those selected from the group consisting of carbon tetrabromide, isooctyl thioglycolate, and mixtures thereof, for reasons of availability.

Initiator

Water-soluble and/or oil-soluble free radical polymerization initiators can be used according to the present invention. Water-soluble initiators are the preferred initiators. Examples of useful water soluble initiators include but are not limited to those selected from the group consisting of potassium persulfate, ammonium persulfate, sodium persulfate, and mixtures thereof. These water soluble initiators may be used in combination with reducing agents such as sodium bisulfite to constitute a redox initiator system. Examples of useful oil-soluble initiators include but are not limited to those selected from the group consisting of diazo compounds such as Vazo™ 64 (2,2'-azobis(isobutyronitrile), Vazo™ 52 (2,2'-azobis(2,4-dimethylpentanenitrile), both available from duPont, peroxides such as benzoyl peroxide and lauroyl peroxide, and mixtures thereof.

The useful, preferred, and most preferred ranges of components which can be used in the latex of the present invention are set forth in Table I.

TABLE I*

| | | Useful (percent by weight) | Preferred (percent by weight) | Most Preferred (percent by weight) |
| --- | --- | --- | --- | --- |
| i | $C_4$–$C_{12}$ alkyl esters of acrylic acid | 70 to 98.5 | 75 to 94 | 85 to 89 |
| ii | High $T_g$ monomer | 0 to 20 | 3 to 15 | 6 to 10 |
| iii | Polar monomer | 1 to 10 | 2 to 8 | 3 to 6 |
| iv | Low molecular weight hydrophobic polymer | 0.5 to 20 | 1 to 10 | 2 to 5 |
| v | Chain transfer agent | 0 to 1.0 | 0.05 to 0.5 | 0.1 to 0.3 |

TABLE I*-continued

|   |   | Useful (percent by weight) | Preferred (percent by weight) | Most Preferred (percent by weight) |
|---|---|---|---|---|
| vi | Crosslinker | 0 to 5 | 0.05 to 2 | 0.1 to 1 |
| vii | Ionic copolymerizable surfactant | 1 to 10 | 1.5 to 6 | 1.5 to 3 |
| viii | Initiator | 0.01 to 1.0 | 0.1 to 0.5 | 0. 2 to 0. 3 |

*The weight percentages of i, ii, iii, and iv are each based on the total weight of i plus ii plus iii plus iv.
The weight percentages of v, vi, vii, and viii are each based on the total weight of i plus ii plus iii plus iv.
The word "about" should be inserted by the reader before each numerical value in the ranges.

The latex adhesives of the present invention are produced by emulsifying a mixture of water, acrylate and vinyl monomers, hydrophobic polymer, ionic copolymerizable surfactant, optionally chain transfer agent, and optionally crosslinker. The emulsion is heated with agitation under nitrogen atmosphere, then treated with initiator in portions to maintain temperature control. The reaction mixture is heated and agitated until reaction is complete. The resulting acrylic latex can be coated and dried, typically at a temperature of about 60° to about 110° C., according to conventional methods known by those skilled in the art.

The latexes prepared in accordance with the present invention are easily coated upon suitable flexible or inflexible backing materials by conventional coating techniques to produce adhesive coated sheet materials in accord with the present invention. The flexible backing material may be any material conventionally utilized as a tape backing or any other flexible material. Typical examples of flexible backing materials employed as conventional tape backings which may be useful for the adhesive compositions of the present invention include those made of paper, plastic films such as polypropylene, polyurethane, polyethylene, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic material, and the like or nonwoven fabric such as air laid webs of natural or synthetic fibers or blends of these. The backing may also be formed of metal, metalized polymeric films, or ceramic sheet materials. The coated sheet materials may take the form of any article conventionally known to be utilized with PSA compositions such as labels, tapes, signs, covers, marking indicia, and the like.

The PSA compositions of the present invention may be coated by any of a variety of conventional coating techniques such as roll coating, spray coating, knife coating, and the like.

Adhesives of the present invention may be used to bond articles to a variety of substrates. For instance, the adhesives provided herein may be used to adhere such items as appliques, e.g., retroreflective or decorative strips or patches, to clothing. As discussed above, advantages of adhesives of the invention include the high adhesion to low energy substrates and high moisture resistance they exhibit. Accordingly, they may be used to adhere articles to substrates which were previously difficult to bond to. For instance, appliques may be bonded to clothing, particularly outerwear such as ski clothing or rainwear which has been treated to impart water-repellency thereto. In an illustrative embodiment, an adhesive of the invention may be used in a retroreflective applique comprising a retroreflective layer on the applique comprising a retroreflective layer on the applique's front face and a layer of such adhesive on the applique's back face. Other illustrative appliques include identification badges or patches for ski wear, decorative designs for raincoats, etc. Appliques, which may be retroreflective or not as desired, can be in any desired shape, e.g., oblong, rectangular, alphanumeric character, or a decorative design.

Typically, the retroreflective layer will comprise a monolayer of retroreflective elements in a binder layer, such as is disclosed in U.S. Pat. No. 3,700,305 (Bingham) and U.S. Pat. No. 3,758,192 (Bingham). Common embodiments of retroreflective elements include microspheres, typically glass, with reflectors thereon. Well known reflectors include dielectric reflectors, metal layers (e.g., aluminum or silver), or nacreous pigment flakes. U.S. Pat. No. 3,700,305 discloses retroreflective constructions comprising microspheres with dielectric reflectors which may be used herein. U.S. Pat. No. 3,758,192 discloses retroreflective constructions comprising microspheres with nacreous pigment flakes. In some embodiments, the reflective layer may comprise a cube-corner retroreflective sheeting with a seal film such as is disclosed in U.S. Pat. No. 4,025,159 (McGrath).

An illustrative retroreflective sheet is made up of a reflective layer comprising a monolayer of glass microspheres with aluminum reflective layers on the back surfaces thereof which are partially embedded in a binder layer, e.g., a thermoset or thermoplastic resin, and a layer of the adhesive of the invention on the back side of the reflective layer. Illustrative examples of binder layer materials useful herein include crosslinking acrylic latex and plasticized nitrile rubber (typically containing phenolic curing agents). In some instances, the front surfaces of the microspheres are partially embedded in a temporary carrier, e.g., polyethylene, used in assembly of the applique to support the microspheres during application of the reflective layers thereto and application of the binder layer thereover. If desired, the carrier may be left in place until the retroreflective sheet is bonded to the final substrate, e.g., a raincoat, and then be removed. Used in this fashion, the carrier facilitates handling and protects the applique during converting, e.g., cutting from sheet form to desired applique shape and size, and application to substrate. Appliques may be made in desired shape, including for example, strips, alphanumeric characters, decorative designs (e.g., stars, lightening bolts, etc.), etc. Retroreflective sheeting of the invention may be wound into roll form if desired.

Adhesives of the invention may be used to bond such appliques to substrates which are typically difficult to bond to, such as nylon or cotton/polyester blends treated with fluorochemicals to impart water repellency thereto. ZEPEL™ Fabric Protector, a fluoroaliphatic resin from DuPont, and SCOTCHGARD™ Fabric Protector, a fluorochemical from 3M, are examples of commonly used treatments. These are used on rainwear, ski clothing, and other fabrics. It has been observed that for appliques to be applied to ZEPEL™ treated nylon useful tack, peel strength, and cohesive strength have been obtained in such applications when the adhesive comprises between about 0.15 and about 0.25 weight percent chain transfer agent and between about 0.05 and about 0.07 weight percent crosslinking agent.

The high-solids moisture-resistant latex pressure-sensitive adhesive of the invention is useful in weather-seal tapes, medical tapes, label stock, and other applications where a solvent-free adhesive having high adhesion, low adhesion build, and water-resistance is desired. The adhesive also is easily coated, since it exhibits both high solids and low viscosity. The adhesive is particularly useful on low energy materials selected from the group consisting of polypropylene, polyethylene, fluorochemical containing materials, and the like. A layer of the adhesive on a release liner may be used as a transfer tape to bond two adherends together.

For medical applications, the preferred backing is disclosed in European Patent Publication No. 0 624,209, entitled Nonwoven Sheet Materials, Tapes and Methods, assigned to the assignee of the present case, incorporated by reference herein.

The nonwoven sheet material comprises a randomly interlaced fibrous web of tensilized nonfracturable staple fibers and binder fibers, wherein the fibrous web is pattern embossed, and is interbonded by a chemical bonding agent, physical entanglement, or a combination thereof, and further wherein the nonwoven sheet material exhibits a Hand measurement of less than 250 grams for about a 20 cm square sheet, and is readily finger-tearable in the cross machine direction.

The tear properties of the nonwoven sheet materials and tapes of the copending application are assessed by a test group of individuals who are familiar with medical tapes, athletic tapes, and the like, their uses, and application techniques.

Each test group comprises four individuals, who are supplied with example nonwoven sheet materials and tapes for evaluation. The test group evaluates these materials and tapes for ease of tear in both the machine direction (i.e. downweb) and cross machine direction (i.e. crossweb), tear initiation, straightness of the tear, smoothness of the torn edge, and the force required to complete the tear. Each of these tear characteristics are rated either excellent (4), good (3), fair (2), poor (1), or none (0) (i.e., the individual was unable to tear the material). The results reported by the four individuals comprising the test group are then combined for each example material, averaged for the four individuals, rounded to the nearest value, and reported as one of the above-noted tear characteristics.

The tear characteristics of the nonwoven sheet materials was evaluated evaluated using 2.5 cm×30 cm or 5 cm×30 cm die cut samples, with the machine direction tear characteristics being evaluated along the 30 cm length, and cross machine direction tear characteristics along the 2.5 cm or 5 cm length. The tear characteristics of example tapes was evaluated on rolled tape having 2.5 cm or 5 cm widths, with the cross machine direction tear characteristics being evaluated along the 2.5 cm or 5 cm length, while the machine direction tear characteristics were evaluated along an approximately 20 cm length of the downweb portion of the tape.

The total Hand measurement in grams of example nonwoven sheet materials or tapes provides a measure of the drape/conformability of these materials. Those materials with a relatively high Hand value are stiff and nonconformable. Conversely, relatively low Hand values reflects soft, conformable materials. The Hand values reported for the following examples were obtained on a Thwing-Albert Handle-o-Meter™ Model No. 211-300 (Thwing-Albert Instrument Co., Philadelphia, Pa.), according to the procedures outlined in the instruction manual included with Model No. 211-300, the disclosure of which is herein incorporated by reference. All of the Hand measurements were performed on about 20 cm sheet materials.

Test Methods

The test methods used in evaluation of various examples of the invention for determining peel adhesion and shear are those described by the American Society for Testing and Materials and in *Test Methods for Pressure-Sensitive Tapes*, Eighth Edition, August 1985, Pressure-Sensitive Tape Council, Glenview, Ill., both incorporated by reference herein.

Peel Adhesion (ASTM P3330-78 PSTC-1 (11/75))

Peel adhesion is the force required to remove a coated flexible sheet material from a test panel measured at a specific angle and rate of removal. In the examples this force is expressed in Newtons per 100 mm (N/dm) width of coated sheet. The procedure follows:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180° C. The free end is attached to the adhesion tester scale.
3. The glass test plate is clamped in the jaws of the tensile testing machine which is capable of moving the plate away from the scale at a constant rate of 2.3 meters per minute.
4. The scale reading in Newtons is recorded as the tape is peeled from the glass surface. The data is recorded as the average value of the range of numbers observed during the test.

Shear Holding Strength (Reference: ASTM: D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

Creep Compliance Procedure

To measure the creep compliance of the skin adhesive of this invention, a 150-micrometer thickness of the adhesive is knife-coated onto a smooth film of polytetrafluoroethylene. The coated film is then dried to constant weight by placing it in an air-circulating oven generally for at least five minutes at 110° C. The skin adhesive, thus dried, is stripped from the polytetrafluoroethylene and two test pieces of equal area are die-cut and placed in a parallel plate creep compliance rheometer, one piece being on each side of the centerplate, with an outer plate contacting the exposed surface of each. Screws which connect the two outer plates are then tightened so as to compress the interposed layers of skin adhesive approximately 10%. The parallel plates are placed in horizontal arrangement and one end of the center plate is connected to a chart recorder. A hook is attached to the opposite end of the center plate with a flexible wire extending horizontally from the hook and then downward over a pulley, the outer plates being held in a fixed position. A suitable weight (one sufficient to measurably deform the sample a distance no greater than its thickness) is attached to the free end of the wire, then the strip chart recorder is started. The weight typically used to exert the stress on the skin adhesive films is 500 grams. From the strip chart recorder, the time and the displacement (strain) are read and the applied force (stress) is recorded. The creep compliance at a given temperature is then calculated using the equation:

$$J_{(t)} = \frac{2AX}{hf}.$$

where t is the time at which the measurement is taken, A is the area of one face of the adhesive samples, h is the thickness of the adhesive mass, X is the displacement at time t (where X is less than h) and f is the force due to the mass attached to the wire connected to the middle plate. Where A is expressed in $cm^2$, h in cm, X in cm, and f in dynes, the compliance value $J_{(t)}$ is given in $cm^2$/dyne.

Skin Adhesion Procedure

The evaluation of the skin adhesives of this invention is highly subjective when the performance in contact with and upon removal from the human skin surface becomes part of the evaluation. For this reason a protocol was developed using a prescribed test panel of individuals who were selected to embrace the normal variations in skin surface that are encountered in medical practice. The result of this designed study enables one to get values which can be considered controlled and comparative. While these values are observational in respect to adhesive residue, sample lift and adhesion build-up, the procedures followed are in accord with carefully developed assessments of similar properties as is known in the art.

The initial skin adhesion value ($T_0$) and the skin adhesion value after 24 or 48 hours in contact with the skin ($T_{24}$ or $T_{48}$) are essentially the widely accepted PSTC-1, peel adhesion test for single coated skin adhesive tapes measured at 180° angle, PSTC-1 is test method No. 1 of the Pressure Sensitive Tape Council, Glenview, Ill., Seventh Edition (1976), incorporated by reference herein; developed by the Specifications and Technical Committee of the Council. The test has been modified only to the extent that the tape is applied to the human skin surface on a selected area on the individual's back. Otherwise the steps in the procedure are as follows:

1. Tape samples 2.54 cm wide by 5.08 cm long are placed on the back of a human subject.
2. Each tape is rolled down with one forward and one reverse pass, using a 1-kilogram tape roller (described in Appendix B, Sections 2.7.1, 2.8.1 and 2.8.2 of Pressure Sensitive Tape Council, all incorporated by reference herein) moved at the rate of about 30 cm per minute.
3. Adhesion to the skin is measured as the peel force required to remove the tape at 180° angle (PSTC-1).

The peel force values are measured through the use of a strain-gauge mounted on a motor-driven carriage. The force of removal is reported in grams of adhesion per 2.54 cm of width of sample. The rate of removal is 15 cm per minute.

4. The adhesion to skin is measured immediately after initial application ($T_0$) and after 24 or 48 hours of continuous contact with the skin ($T_{24}$ or $T_{48}$). A preferred skin adhesive will generally exhibit a $T_0$ of between 50 grams to about 100 grams and a $T_{48}$ of between about 150 grams to about 300 grams.

Adhesive Residue Test

When the skin adhesion test described above is performed, the skin underlying the tape sample is visually inspected to determine the amount of adhesive residue left on the surface of the skin. Each sample is assigned a numerical rating from 0 to 5 based on the following scale.

| Rating | Definition |
| --- | --- |
| 0 | No visible residue |
| 1 | Only residue at edges of tape |
| 2 | Residue covering 1% to 25% of tested area |
| 3 | Residue covering 25% to 50% of tested area |
| 4 | Residue covering 50% to 75% of tested area |
| 5 | Residue covering 75% to 100% of tested area |

The results of all tape samples of a given panel were averaged and are reported below. Due to the subjectivity of the visual inspection for residue, no degree of precision should be inferred from the numbers to the right of the decimal point and those numbers should be treated as only rough approximations. Preferred skin adhesives will generally exhibit an average residue rating below about 2.5.

Abbreviations and Tradenames

The following abbreviation and tradenames are used herein.

Alipal EP110: Ammonium salt of sulfated nonylphenoxy poly(ethyleneoxy)ethanol. A nonpolymerizable surfactant available from GAF.

Mazon SAM-211: Unsaturated poly(alkoxyethyl)sulfate. A polymerizable surfactant available from PPG Industries.

Piccolastic™ A-75: Polystyrene resin available from Hercules, with Mn=731, PDI=1.77, and softening point=75° C.

Piccolastic™ D-125: Polystyrene resin available from Hercules, with Mn=41,670 and 875 (40:60), and softening point=125° C.

Piccolastic™ D-150: Polystyrene resin available from Hercules, with Mn=39,794 and 1,035 (77:23), and softening point=150° C.

Foral 85: Hydrocarbon rosin ester available from Hercules.
PP: Polypropylene
SS: Stainless steel
AA: Acrylic Acid
min: minutes
PS: Polystyrene
Ex.: Example
IOA: Isooctyl acrylate
VAc: Vinyl acetate
$CBr_4$: Carbon tetrabromide, a chain transfer agent
PS: Polystyrene
HDDA: Hexanediol diacrylate, a crosslinking agent
PDI: Polydispersity index (Mw/Mn)
Comp.: Comparative

EXAMPLES

All parts, percentages, ratios, etc. used in the Examples and the rest of the specification are by weight unless indicated otherwise.

The following is a description of the polymerization process of the invention. Water, ionic copolymerizable surfactant, and monomer mixture are homogenized in a Waring™ blender at high speed to form a stable emulsion having monomer droplets of less than 500 nm in diameter. The emulsion is transferred to a reaction flask equipped with a stirrer, a reflux condenser, nitrogen inlet, and a thermometer, and heated with stirring under nitrogen. At 32° C., ½ of the initiator is added, generating a reaction exotherm. After 30 minutes the remaining initiator is added and the temperature of the reaction is raised to 75° C. for an additional two hours. On cooling, the resultant latex is coated on a substrate for testing. Performance of formulations for Comparative Examples 1, 3, and 7 and Examples 2, 4–6, and 8–10 are shown in Table II.

Comparative Example 1

The following ingredients were admixed according to the procedure described below to produce a 70% solids latex pressure-sensitive adhesive.

| Ingredients | Weight (grams) | Weight (grams) |
| --- | --- | --- |
| Deionized Water | 141 | |
| Alipal EP110 (30% active) | 41.6 | |
| Acrylic Acid | 12.8 | |
| Isooctyl Acrylate | 370 | |
| Vinyl Acetate | 25 | |
| Polystyrene Resin* | 8.3 | |
| Carbon Tetrabromide | 0.83 | |
| 1,6-Hexanediol diacrylate | 0.42 | |
| Redox Initiator | 1st charge | 2nd charge |
| Potassium Persulfate ($K_2S_2O_8$) | 0.20 | 0.40 |
| Sodium meta-BiSulfite ($Na_2S_2O_5$) | 0.05 | 0.10 |
| Deionized Water | 4.0 | 8.0 |
| 1% Ferrous Sulfate 7-hydrate solution ($FeSO_4 7H_2O$) | 0.40 | — |

*Polystyrene Resin: The polystyrene resin in Comparative Example 1 and Example 2 is a low molecular weight (Mw = 2121, Mn = 1923) monodisperse (PDI = 1.1) oligomer made by standard anionic polymerization of styrene monomer in anhydrous cyclohexane using sec-butyl lithium as a catalyst.

To prepare the high solids latex PSA, deionized water, Alipal EP110 surfactant, the monomers AA, IOA, and VAc, and polystyrene resin were charged into a Waring™ Blender, and homogenized at high speed for 1 minute under a nitrogen atmosphere to prepare a stable emulsion with monomer droplet size less than 500 nm for the polymerization. After homogenization, the emulsion was transferred to a 4-neck flask equipped with a reflux condenser, thermometer, stirrer, and a nitrogen gas inlet. The emulsion was then stirred and heated to the initiation temperature 32° C. under a nitrogen atmosphere. When the batch temperature reached 32° C., the 1st charge of the redox initiator was added into the reactor to initiate the polymerization. The reaction was allowed to exotherm. Thirty minutes after the peak temperature, the 2nd charge of the redox initiator was added into the emulsion to cure the reaction at 75° C. for another two hours. The use of separate charges of redox initiator was to control the heat of polymerization. The solids content of the resultant latex was 70% and the viscosity thereof was 3710 cps. The 180° peel adhesion of the adhesive to glass at 2.3 m/min. peeling rate was 65 N/dm and the shear was 18 minutes at 12.5 mm×12.5 mm–1 Kg load.

Example 2

Substantially the same procedures and ingredients described in Comparative Example 1 were used except that a copolymerizable surfactant, Mazon SAM-221, was used in place of the conventional surfactant, Alipal EP110, to improve the moisture resistance of the latex coating. In addition the solids content for Example 2 was 65%.

| Ingredient | Weight (grams) | Weight (grams) |
| --- | --- | --- |
| Deionized Water | 293 | |
| Mazon-SAM 211 | 14 | |
| AA | 17 | |
| IOA | 490 | |
| VAc | 33 | |
| PS** | 11 | |
| $CBr_4$ | 1.10 | |
| HDDA | 0.56 | |
| Redox Initiator | 1st charge | 2nd charge |
| $K_2S_2O_8$ | 0.20 | 0.40 |
| $Na_2S_2O_5$ | 0.05 | 0.10 |
| Deionized Water | 4.0 | 8.0 |
| 1% $FeSO_4.7H_2O$ | 0.40 | — |

**PS: Polystyrene resin, Mw = 2,121, Mn = 1,923, PDI = 1.1

The solids content of the resultant latex was 64.3% and the viscosity thereof was 530 cps. The 180° peel adhesion of the adhesive to glass at 2.3 m/min. was 60 N/dm and the shear was 34 minutes at 12.5 mm×12.5 mm×1 kg load. It was found that the use of the copolymerizable surfactant can enhance the cohesive strength of the adhesive, as compared to Comparative Example 1.

Comparative Example 3

Comparative Example 3 employed substantially the same procedures and ingredients described in Example 2, except that no polystyrene oligomer was used. The latex was stable during the polymerization but coagulated upon cooling. Comparative Example 3 indicates the importance of the low molecular weight hydrophobic polymer to the latex stability.

Examples 4 to 6

Examples 4 to 6 employed substantially the same procedures and ingredients described in Example 2, except the low molecular weight monodisperse polystyrene oligomer was replaced by the commercially available polystyrene resins Piccolastic™ A-75, D-125, and D-150, respectively. The properties of the resultant latexes are shown below.

| | Example | | |
| --- | --- | --- | --- |
| | 4 | 5 | 6* |
| Polystyrene Resin | Piccolastic™ A-75 | Piccolastic™ D-125 | Piccolastic™ D-150 |
| Solids (%) | 63 | 63 | 55 |
| Viscosity (cps) | 762 | 788 | 132 |
| 180° peel adhesion to glass at 2.3 m/min. (N/dm) | 65 | 63 | 56 |

-continued

| | Example | | |
|---|---|---|---|
| | 4 | 5 | 6* |
| Shear 12.5 mm × 12.5 mm × 1 Kg (min) | 9 | 31 | 75 |

*Example 6 was run at lower solids and with 0.83 g chain transfer agent ($CBr_4$).

Comparative Example 7 and Examples 8 and 9

Comparative Example 7 and Examples 8 and 9 were prepared according to the procedure described in Comparative Example 1 except for the use of the particular components set forth in the table below. The effect of copolymerizable and non-copolymerizable surfactants on the moisture resistance of the latex coatings was investigated. It was found that the high solids latex PSA prepared with the copolymerizable surfactant, Mazon SAM 211, yielded excellent moisture resistance as an indication of no adhesion reduction of the adhesive under 38° C./100% relative humidity for 7 days, as seen in Table II Comparative Example 7 and Examples 8 and 9. The Examples show that good adhesion to low energy surfaces such as polypropylene with high sheer can be achieved by using copolymerizable surfactant alone or in combination with conventional surfactant(s).

| Ingredients | Comp.Ex. 7* Weight (grams) | Ex. 8** Weight (grams) | Ex. 9*** Weight (grams) |
|---|---|---|---|
| Deionized Water | 345 | 360 | 371 |
| Alipal EP110 (30% active) | 43 | 21.7 | — |
| Mazon SAM-211 | — | 6.8 | 16.4 |
| AA | 20 | 20 | 20 |
| IOA | 578 | 578 | 578 |
| VAc | 39 | 39 | 39 |
| Piccolastic ™ A-75 | 13 | 13 | 13 |
| $CBr_4$ | 1.3 | 1.3 | 1.3 |
| HDDA | 0.66 | 0.66 | 0.66 |

| Redox Initiator | 1st charge | 2nd charge | Redox Initiator Charges | Redox Initiator Charges |
|---|---|---|---|---|
| $K_2S_2O_8$ | 0.40 | 0.40 | Same as Comp.Ex.7 | Same as Comp.Ex.7 |
| $Na_2S_2O_5$ | 0.10 | 0.10 | | |
| Deionized Water | 8.0 | 8.0 | | |
| 1% $FeSO_4.7H_2O$ | 0.4 | — | | |

*Comparative Example 7 uses 100% of Alipal EP110 surfactant
**Example 8 uses 1:1 ratio of Alipal EP110 and Mazon SAM-211 mixture
***Example 9 uses 100% of Mazon SAM-211 surfactant

Example 10

The following ingredients were admixed according to the procedure described in Comparative Example 1. Foral™ 85 rosin ester, available from Hercules, was used in place of the polystyrene oligomer for the preparation of a high solids, high adhesion, and moisture resistant latex PSA.

| Ingredient | Weight (grams) | Weight (grams) |
|---|---|---|
| Deionized Water | 419 | |
| Mazon SAM-211 | 13.7 | |
| AA | 16.5 | |
| IOA | 447 | |
| VAc | 33 | |
| Foral 85 | 55 | |
| $CBr_4$ | 0.55 | |
| HDDA | 0.55 | |

| Redox Initiator | 1st charge | 2nd charge |
|---|---|---|
| $K_2S_2O_8$ | 0.4 | 0.4 |
| $Na_2S_2O_5$ | 0.1 | 0.1 |
| Deionized Water | 8.0 | 8.0 |
| 1% $FeSO_4.7H_2O$ | 0.4 | — |

The initiation temperature of the reaction was 40° C. The solids content of the resultant latex was 55% and the viscosity thereof was 700 cps. The 180° peel adhesion to glass was 72 N/dm at 2.3 m/min. peeling rate. This example illustrates the preparation of high solids, high adhesion, and moisture resistant latex PSAs by introducing a typical rosin ester tackifier instead of polystyrene and a copolymerizable surfactant during preparation of the latex.

Example 11

The following ingredients were admixed according to the procedure described in Comparative Example 1. This Example illustrates the preparation of an adhesive for use in medical tapes. The latex was coated onto a polyester nonwoven backing, and the resulting medical tapes were tested for compliance and skin adhesion as described above.

| Ingredient (% by weight) | |
|---|---|
| Isooctyl acrylate | 89 |
| Vinyl acetate | 6 |
| Acrylic Acid | 3 |
| Piccolast ™ D-125 | 2 |
| MAZON SAM-211 | 2.5* |
| $CBr_4$ | 0.15* |
| HDDA | 0.10* |

*Each based on total weight of monomers plus Piccolast ™ D-125

Test Values for the Coated Adhesive of Example 11

| Peel Adhesion, N/dm | |
|---|---|
| Glass | 56 |
| Polypropylene | 54 |
| Shear, min | 170 |
| 12.5 mm × 12.5 mm × 1.0 Kg, polyester backing | |
| Creep compliance, $cm^2$/dyne | $1.07 \times 10^{-5}$ |
| Initial Skin Adhesion, $T_0$, gm/2.54 cm | 55 |
| 48 Hr. Skin Adhesion, $T_{48}$, gm/2.54 cm | 181 |
| Adhesive Residue Value | 1.33 |

TABLE II

| Example/Formulation | Variable | Shear[1] min. | Peel Adhesion[2], N/dm Glass | PP | SS | SS+ Humidity[3] | Adhesion Reduction (%) | % Solids | Viscosity[4] cps |
|---|---|---|---|---|---|---|---|---|---|
| Comp. 1 | Alipal EP110, PS resin | 18 | 65 | | | | | 70 | 3710 |
| 2 | SAM-211, PS resin | 34 | 60 | | | | | 64 | 530 |
| Comp. 3 | SAM-211, no oligomer | | -coagulated- | | | | | | |
| 4 | SAM-211, A-75 | 9 | 65 | | | | | 63 | 762 |
| 5 | SAM-211, D-125 | 31 | 63 | | | | | 63 | 788 |
| 6 | SAM-211, D-150 | 75 | 56 | | | | | 55 | 132 |
| Comp. 7 | Alipal EP110, A-75 | 11 | 99 | 47 | 110 | 23 | 79 | 63 | 574 |
| 8 | Alipal EP110: SAM-211 (1:1); A-75 | 45 | 78 | 45 | 55 | 41 | 25 | 63 | 571 |
| 9 | SAM-211, A-75 | 32 | 63 | 52 | 74 | 89 | 0 | 62 | 304 |
| 10 | Foral 85, SAM-211 | 4 | 72 | | | | | 55 | 700 |

[1]Shear: 12.5 mm × 12.5 min × 1 Kg
[2]Peel Adhesion: N/dm at 2.3 m/min. peeling rate
[3]After 7 days at 38° C. and 100% humidity
[4]Viscosity measurement calculated using a Brookfied Viscometer Adhesion Reduction: (initial peel adhesion to SS - peel adhesion to SS after aging)/initial peel adhesion to SS While this invention has been described in connection with specific embodiments, it should be understood that it is capable of further modification. The claims herein are intended to cover those variations which one skilled in the art would recognize as the chemical equivalent of what has been described here.

We claim:

1. A latex comprising:
   (a) about 40 to about 70 weight percent of a solid phase, said solid phase comprising the reaction product of:
      (i) about 70 to about 98.5 percent by weight of monomer selected from the group consisting of $C_4$ to $C_{12}$ alkyl acrylate ester monomer and mixtures thereof;
      (ii) about 0 to about 20 percent by weight of monomer selected from the group consisting of vinyl esters, $C_1$ to $C_4$ esters of (meth)acrylic acid, styrene, and mixtures thereof;
      (iii) about 1 to about 10 percent by weight of polar monomer copolymerizable with monomer(s) of element (a)(i) and element (a)(ii);
      (iv) about 0.5 to about 20 percent by weight of a hydrophobic polymer selected from the group consisting of polybutadiene, butadiene-styrene block copolymers, rosin esters, and mixtures thereof, which is incapable of reaction with said monomers of elements (a)(i), (a)(ii), and (a)(iii), wherein said hydrophobic polymer has a number average molecular weight ranging from about 400 to about 50,000, and wherein the hydrophobic polymer is selected such that it would not act as a plasticizer;
      (v) about 0.01 to about 1 percent by weight of an initiator;
      (vi) about 1 to about 10 percent by weight of an ionic copolymerizable surfactant;
      (vii) about 0 to 1 percent by weight of a chain transfer agent; and
      (viii) about 0 to 5 percent by weight of a crosslinking agent;
   wherein the percentages of (v), (vi), (vii), and (viii) are each based on total weight of (i) plus (ii) plus (iii) plus (iv) and wherein the weight percentages of (i), (ii), (iii) and (iv) are each based on the total weight of (i) plus (ii) plus (iii) plus (iv); and
   (b) about 30 to about 60 percent by weight of an aqueous phase; wherein said weight percentages of (a) and (b) are each based on the total weight of said latex.

2. The latex of claim 1 wherein said chain transfer agent is selected from the group consisting of carbon tetrabromide, mercaptans, alcohols, and mixtures thereof.

3. The latex of claim 1 which comprises a crosslinking agent selected from the group consisting of hexanedioldiacrylate, poly(ethyleneglycol)diacrylates, poly(butadiene)diacrylates, polyurethane diacrylates, trimethylolpropane triacrylate, divinyl benzene, 4-acryloxybenzophenone, and mixtures thereof.

4. The latex of claim 1 wherein said polar monomer is selected from the group consisting of acrylic acid, methacrylic acid, itaconic acid, hydroxyalkyl acrylates, styrene sulfonic acid, sodium salt of styrene sulfonic acid, maleic acid, fumaric acid, citraconic acid, acrylamides, substituted acrylamides, N-vinylpyrrolidone, N-vinylcaprolactam, acrylonitrile, dimethylamino ethylmethacrylate, and mixtures thereof.

5. The latex of claim 1 wherein said hydrophobic polymer has a number average molecular weight ranging from about 500 to about 20,000.

6. The latex of claim 1 wherein said $C_4$ to $C_{12}$ alkyl acrylate ester monomer is selected from the group consisting of n-butyl acrylate, amyl acrylate, hexyl acrylate, isooctyl acrylate, 2-ethyl hexyl acrylate, isononyl acrylate, decyl acrylate, dodecyl acrylate, and mixtures thereof.

7. The latex of claim 1 wherein said ionic copolymerizable surfactant is selected from the group consisting of alkylene polyalkoxy ammonium sulfate having about 5 to about 25 alkoxy groups and alkyl allyl sulfosuccinates.

8. The latex of claim 1, wherein the hydrophobic polymer of the solid phase is present with at least components (i), (ii), (iii), and (vi) prior to initiation of a reaction between the components to form the solid phase.

9. The latex of claim 1, wherein the hydrophobic polymer is insoluble in the aqueous phase.

10. The latex of claim 1, wherein the latex is free of organic solvents.

11. The latex of claim 1, wherein the hydrophobic polymer comprises at least one rosin ester.

12. An adhesive coated sheet material comprising a backing at least partially coated over one major surface with a pressure-sensitive adhesive formed by coating and drying the latex of claim 1.

13. The adhesive coated sheet material of claim 12 wherein said backing is a solid film of polymeric material which will transport moisture therethrough.

14. The adhesive coated sheet material of claim 13 wherein said polymeric material is polyurethane.

15. The adhesive coated sheet material of claim 12 wherein said backing is selected from the group consisting of low surface energy materials.

16. The adhesive coated sheet material of claim 12 wherein said backing comprises a material selected from the group consisting of cotton, nylon, rayon, glass, and ceramic material.

17. A retroreflective applique comprising a sheet of claim 16 cut into a strip, alphanumeric character, or decorative design.

18. The adhesive coated sheet material of claim 12 wherein said backing comprises a nonwoven fabric.

19. A retroreflective sheet comprising a retroreflective layer and a layer of pressure-sensitive adhesive formed by coating and drying the latex of claim 1.

20. The sheet of claim 19 wherein said retroreflective layer comprises a monolayer of retroreflective elements.

21. The sheet of claim 20 wherein said retroreflective elements are partially embedded in a binder layer comprising crosslinked acrylic latex or plasticized nitrile rubber and phenolic curing agent.

22. The sheet of claim 19 wherein said adhesive comprises between about 0.15 and about 0.25 weight percent of said chain transfer agent and between about 0.05 and about 0.07 of said crosslinking agent.

23. The sheet of claim 19 further comprising a temporary carrier on the front of the retroreflective layer.

24. A transfer tape comprising a layer of pressure-sensitive adhesive formed by coating and drying the latex of claim 1 and a release liner.

25. An applique for adhesion to fabric, said applique being in the shape of an alphanumeric character or decorative design and comprising a pressure-sensitive adhesive formed by coating and drying the latex of claim 1.

26. A garment to which the applique of claim 25 has been bonded with said adhesive.

27. A latex comprising:
(a) about 50 to about 65 weight percent of a solid phase, said solid phase comprising the reaction product of:
  (i) about 75 to about 94 percent by weight of $C_4$ to $C_{12}$ alkyl acrylate ester monomer;
  (ii) about 3 to about 15 percent by weight of monomer selected from the group consisting of vinyl esters, $C_1$ to $C_4$ esters of (meth)acrylic acid, styrene, and mixtures thereof;
  (iii) about 2 to about 8 percent by weight of polar monomer copolymerizable with said monomer(s) of elements (a)(i) and (a)(ii);
  (iv) about 1 to 8 percent by weight of a hydrophobic polymer which is incapable of reaction with said monomers of elements (a)(i), (a)(ii), and (a)(iii), wherein said hydrophobic polymer has a number average molecular weight ranging from about 500 to about 20,000, and wherein the hydrophobic polymer is selected such that it would not act as a plasticizer;
  (v) about 0.1 to about 0.5 percent by weight of an initiator;
  (vi) about 1.5 to about 6 percent by weight of an ionic copolymerizable surfactant;
  (vii) about 0.05 to about 0.5 percent by weight of a chain transfer agent; and
  (viii) about 0.05 to about 2 percent by weight of a crosslinking agent;
  wherein the weight percentages of (v), (vi), (vii), and (viii) are each based on the total weight of (i) plus (ii) plus (iii) plus (iv) and wherein the weight percentages of (i), (ii), (iii) and (iv) are each based on the total weight of (i) plus (ii) plus (iii) plus (iv); and
(b) about 35 to about 50 percent by weight of an aqueous phase; wherein said weight percentages of (a) and (b) are each based on the total weight of said latex.

28. A latex comprising:
(a) about 55 to about 62 weight percent of a solid phase, said solid phase comprising the reaction product of:
  (i) about 85 to about 89 percent by weight of monomer selected from the group consisting of $C_4$ to $C_{12}$ alkyl acrylate ester monomers and mixtures thereof;
  (ii) about 6 to about 10 percent by weight of monomer selected from the group consisting of vinyl esters, $C_1$ to $C_4$ esters of (meth)acrylic acid, styrene, and mixtures thereof;
  (iii) about 3 to about 6 percent by weight of polar monomer copolymerizable with said monomer(s) of elements (a)(i) and (a)(ii);
  (iv) about 2 to about 5 percent by weight of a hydrophobic polymer which is incapable of reaction with said monomers of elements (a)(i), (a)(ii), and (a)(iii), wherein said hydrophobic polymer has a number average molecular weight ranging from about 600 to about 10,000, and wherein the hydrophobic polymer is selected such that it would not act as a plasticizer;
  (v) about 0.2 to about 0.3 percent by weight of an initiator;
  (vi) about 1.5 to about 3 weight percent of an ionic copolymerizable surfactant;
  (vii) about 0.1 to about 0.3 percent by weight of a chain transfer; and
  (viii) about 0.1 to about 1.0 percent by weight of a crosslinking agent;
  wherein the weight percentages of (v), (vi), (vii), and (viii) are each based on the total weight of (i) plus (ii) plus (iii) plus (iv) and wherein the weight percentages of (i), (ii), (iii) and (iv) are each based on the total weight of (i) plus (ii) plus (iii) plus (iv); and
(b) about 38 to about 45 percent by weight of an aqueous phase;
wherein said weight percentages of (a) and (b) are each based on the total weight of said latex.

29. The latex of claim 28, wherein said hydrophobic polymer is selected from the group consisting of polybutadiene, butadiene-styrene block copolymers, rosin esters, and mixtures thereof.

30. A latex comprising:
(a) about 40 to about 70 weight percent of a solid phase, said solid phase comprising the reaction product of:
  (i) about 70 to about 98.5 percent by weight of monomer selected from the group consisting of $C_4$ to $C_{12}$ alkyl acrylate ester monomer and mixtures thereof;
  (ii) about 0 to about 20 percent by weight of monomer selected from the group consisting of vinyl esters, $C_1$ to $C_4$ esters of (meth)acrylic acid, styrene, and mixtures thereof,
  (iii) about 1 to about 10 percent by weight of polar monomer copolymerizable with monomer(s) of element (a)(i) and element (a)(ii);

(iv) about 0.5 to about 20 percent by weight of a hydrophobic polymer selected from the group consisting of polybutadiene, butadien-styrene block copolymers, rosin esters, and mixtures thereof, which is incapable of reaction with said monomers of elements (a)(i), (a)(ii), and (a)(iii), wherein said hydrophobic polymer has a number average molecular weight ranging from about 400 to about 50,000, and wherein the hydrophobic polymer is selected such that it would not act as a plasticizer;

(v) about 0.01 to about 1 percent by weight of an initiator, (vi) about 1 to about 10 percent by weight of a surfactant mixture wherein said surfactant mixture comprises from about 40 to about 99.5 percent by weight of an ionic copolymerizable surfactant and about 0.5 to about 60 percent by weight of a non-copolymerizable surfactant based upon the total weight of said surfactant mixture;

(vii) about 0 to 1 percent by weight of a chain transfer agent; and (viii) about 0 to 5 percent by weight of a crosslinking agent;

wherein the percentages of (v), (vi), (vii), and (viii) are each based on total weight of (i) plus (ii) plus (iii) plus (iv) and wherein the weight percentages of (i), (ii), (iii) and (iv) are each based on the total weight of (i) plus (ii) plus (iii) plus (iv); and (b) about 30 to about 60 percent by weight of an aqueous phase; wherein said weight percentages of (a) and (b) are each based on the total weight of said latex.

31. A latex comprising:

(a) about 40 to about 70 weight percent of a solid phase, said solid phase comprising the reaction product of:

(i) about 70 to about 98.5 percent by weight of monomer selected from $C_4$ to $C_{12}$ alkyl acrylate ester monomers and mixtures thereof;

(ii) about 0 to about 20 percent by weight of monomer selected from vinyl esters, $C_1$ to $C_4$ esters of (meth)acrylic acid, styrene, and mixtures thereof;

(iii) about 1 to about 10 percent by weight of polar monomer copolymerizable with monomer(s) of components (i) and (ii);

(iv) about 0.5 to 8 percent by weight of a hydrophobic polymer that is incapable of reaction with said monomer(s) of components (a)(i), (a)(ii), and (a)(iii), wherein said hydrophobic polymer has a number average molecular weight ranging from about 400 to about 50,000, and wherein the hydrophobic polymer is selected such that it would not act as a plasticizer, (v) about 0.01 to about 1 percent by weight of an initiator;

(vi) about 1 to about 10 percent by weight of an ionic copolymerizable surfactant;

(vii) about 0 to 1 percent by weight of a chain transfer agent; and (viii) about 0 to 5 percent by weight of a crosslinking agent;

wherein weight percentages of (i), (ii), (iii), (iv), (v), (vi), (vii), and (viii) are each based on total weight of (i) plus (ii) plus (iii) plus (iv); and (b) about 30 to about 60 percent by weight of an aqueous phase, wherein weight percentages of (a) and (b) are each based on total weight of said latex.

32. The latex of claim 31, wherein the solid phase comprises the reaction product of (iv) about 2 to about 5 percent by weight hydrophobic polymer.

33. An adhesive coated sheet material comprising a backing at least partially coated over one major surface with a pressure-sensitive adhesive formed by coating and drying the latex of claim 31.

34. A transfer tape comprising:

a layer of pressure-sensitive adhesive formed by coating and drying the latex of claim 31, and a release liner.

35. The latex of claim 31 wherein said hydrophobic polymer is selected from the group consisting of polystyrene resins, poly(methyl methacrylate) resin, polybutadiene, poly(alpha-methylstyrene), butadiene-styrene block copolymers, rosin esters, and mixtures thereof.

36. The latex of claim 31, wherein the hydrophobic polymer comprises at least one polystyrene resin.

37. A latex comprising:

(a) about 40 to about 70 weight percent of a solid phase, said solid phase comprising the reaction product of:

(i) about 70 to about 98.5 percent by weight of monomer selected from the group consisting of $C_4$ to $C_{12}$ alkyl acrylate ester monomer and mixtures thereof;

(ii) about 0 to about 20 percent by weight of monomer selected from the group consisting of vinyl esters, $C_1$ to $C_4$ esters of (meth)acrylic acid, styrene, and mixtures thereof;

(iii) about 1 to about 10 percent by weight of polar monomer copolymerizable with monomer(s) of element (a)(i) and element (a)(ii);

(iv) about 0.5 to 8 percent by weight of a hydrophobic polymer that is incapable of reaction with said monomers of elements (a)(i), (a)(ii), and (a)(iii), wherein said hydrophobic polymer has a number average molecular weight ranging from about 400 to about 50,000, and wherein the hydrophobic polymer is selected such that it would not act as a plasticizer;

(v) about 0.01 to about 1 percent by weight of an initiator;

(vi) about 1 to about 10 percent by weight of a surfactant mixture wherein said surfactant mixture comprises from about 40 to about 99.5 percent by weight of an ionic copolymerizable surfactant and about 0.5 to about 60 percent by weight of a non-copolymerizable surfactant based upon the total weight of said surfactant mixture;

(vii) about 0 to 1 percent by weight of a chain transfer agent; and (viii) about 0 to 5 percent by weight of a crosslinking agent;

wherein the percentages of (v), (vi), (vii), and (viii) are each based on total weight of (i) plus (ii) plus (iii) plus (iv) and wherein the weight percentages of (i), (ii), (iii) and (iv) are each based on the total weight of (i) plus (ii) plus (iii) plus (iv); and (b) about 30 to about 60 percent by weight of an aqueous phase; wherein said weight percentages of (a) and (b) are each based on the total weight of said latex.

* * * * *

UNITED STATES PATENT AND TRADEMARK OFFICE
CERTIFICATE OF CORRECTION

PATENT NO.    : 6,048,611                                         Page 1 of 1
DATED         : April 11, 2000
INVENTOR(S)   : Ying-Yuh Lu, Michael D. Crandall, and Robert D. Koppes It is certified that error appears in the above-identified patent and that said Letters Patent is hereby corrected as shown below:

Title page,
Under "Foreign Patent Documents", the following reference should be added
-- 0,244,841 EP0 --;

Column 21,
Line 3, "butadien-styrene" should read -- butadiene-styrene --; and
Line 25, "on total" should read -- on the total --.

Signed and Sealed this

Fourth Day of September, 2001

Attest:

*Nicholas P. Godici*

NICHOLAS P. GODICI
*Attesting Officer*     *Acting Director of the United States Patent and Trademark Office*